(12) United States Patent
Dower

(10) Patent No.: US 8,138,718 B2
(45) Date of Patent: Mar. 20, 2012

(54) DOCKING BAY FOR CONDITIONALLY SUPPLYING BATTERY RECHARGING ENERGY TO A VEHICLE UTILIZING NON PLUG-IN ELECTRICAL CONTACT BETWEEN A PAIR OF DOCKING BAY CONTACTS AND A PAIR OF VEHICLE CONTACTS

(76) Inventor: Gordon Ewbank Dower, Point Roberts, WA (US)

( * ) Notice: Subject to any disclaimer, the term of this patent is extended or adjusted under 35 U.S.C. 154(b) by 112 days.

(21) Appl. No.: 12/734,852

(22) PCT Filed: Nov. 28, 2008

(86) PCT No.: PCT/US2008/013223
§ 371 (c)(1),
(2), (4) Date: May 27, 2010

(87) PCT Pub. No.: WO2009/070334
PCT Pub. Date: Jun. 4, 2009

(65) Prior Publication Data
US 2010/0308768 A1    Dec. 9, 2010

Related U.S. Application Data

(60) Provisional application No. 61/004,602, filed on Nov. 27, 2007, provisional application No. 61/128,943, filed on May 27, 2008.

(51) Int. Cl.
*H02J 7/00*          (2006.01)
(52) U.S. Cl. .......................................... 320/109
(58) Field of Classification Search .................. 320/109
See application file for complete search history.

(56) References Cited

U.S. PATENT DOCUMENTS

| | | | |
|---|---|---|---|
| 3,603,860 A | 9/1971 | Johnson | |
| 3,938,018 A * | 2/1976 | Dahl | 320/140 |
| RE29,994 E * | 5/1979 | Bossi | 191/2 |
| 4,158,802 A | 6/1979 | Rose, II | |
| 4,347,472 A | 8/1982 | Lemelson | |
| 4,496,896 A | 1/1985 | Melocik et al. | |
| 4,777,416 A | 10/1988 | George, II et al. | |
| 4,795,358 A | 1/1989 | Lyles | |
| 5,049,802 A | 9/1991 | Mintus et al. | |
| 5,272,431 A | 12/1993 | Nee | |
| 5,646,500 A | 7/1997 | Wilson | |
| 5,654,621 A * | 8/1997 | Seelig | 320/108 |
| 6,748,297 B2 | 6/2004 | Song et al. | |
| 7,023,177 B1 | 4/2006 | Bussinger | |
| 7,077,072 B2 | 7/2006 | Wingett et al. | |
| 7,133,746 B2 | 11/2006 | Abrahamson et al. | |
| 2004/0201361 A1* | 10/2004 | Koh et al. | 320/104 |
| 2006/0219448 A1* | 10/2006 | Grieve et al. | 180/65.3 |
| 2006/0250902 A1 | 11/2006 | Bender et al. | |

* cited by examiner

*Primary Examiner* — Arun Williams

(57) ABSTRACT

Docking bays for providing energy to vehicles having a rechargeable battery are disclosed. A given docking bay includes a pair of normally de-energized, unprotected, docking bay contacts for making electrical contact with cooperative vehicle contacts when the vehicle is driven into the docking bay. Typically the vehicle will be an electric vehicle, but is not necessarily an electric vehicle. The given docking bay also includes a contact energizer having an output operatively connected to the docking bay contacts and an input connectable to an external source of energy, for example a domestic AC power grid. The energizer is switchable in response to an energizer control signal from a first state where battery recharging energy is not provided to the docking bay contacts to a second state where battery recharging energy derived from the external source is provided to the docking bay contacts. A controller is operatively connected to the energizer.

18 Claims, 8 Drawing Sheets

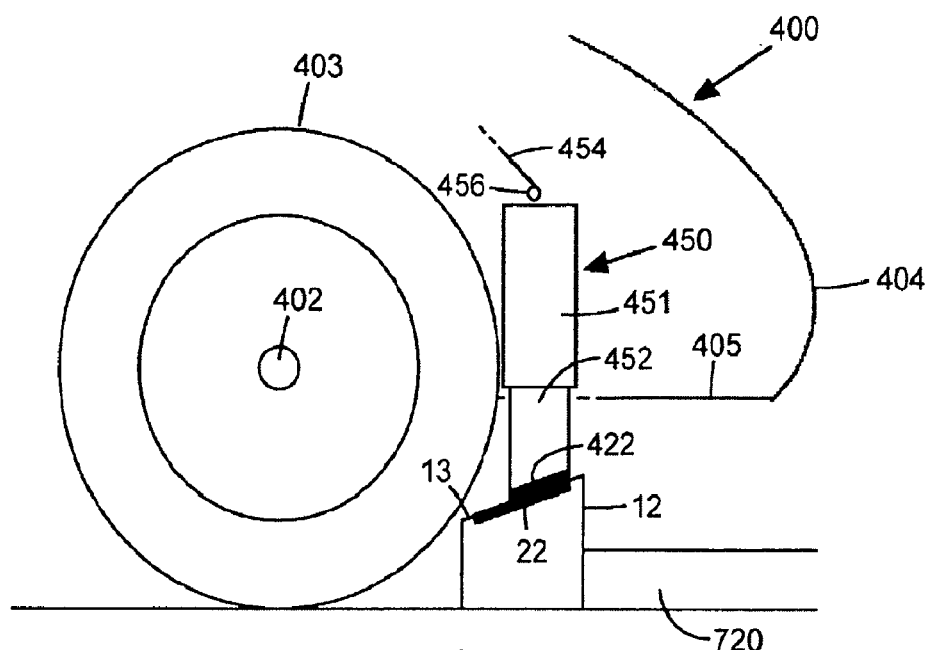
FIG. 3
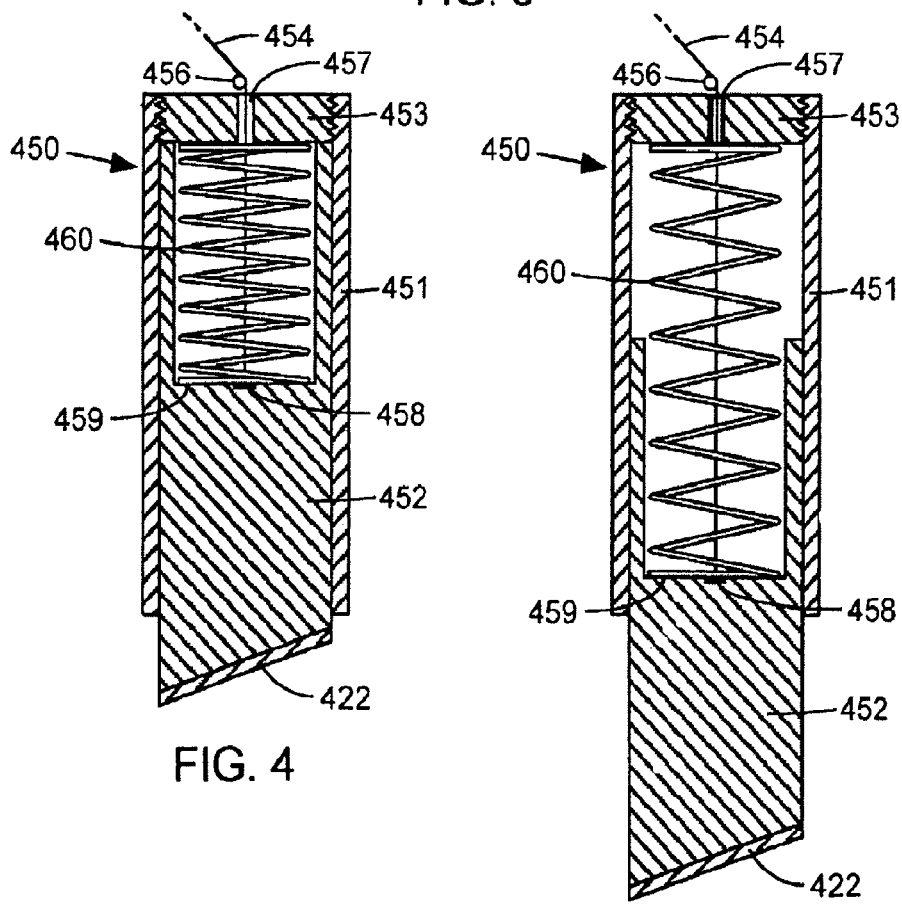
FIG. 4
FIG. 5

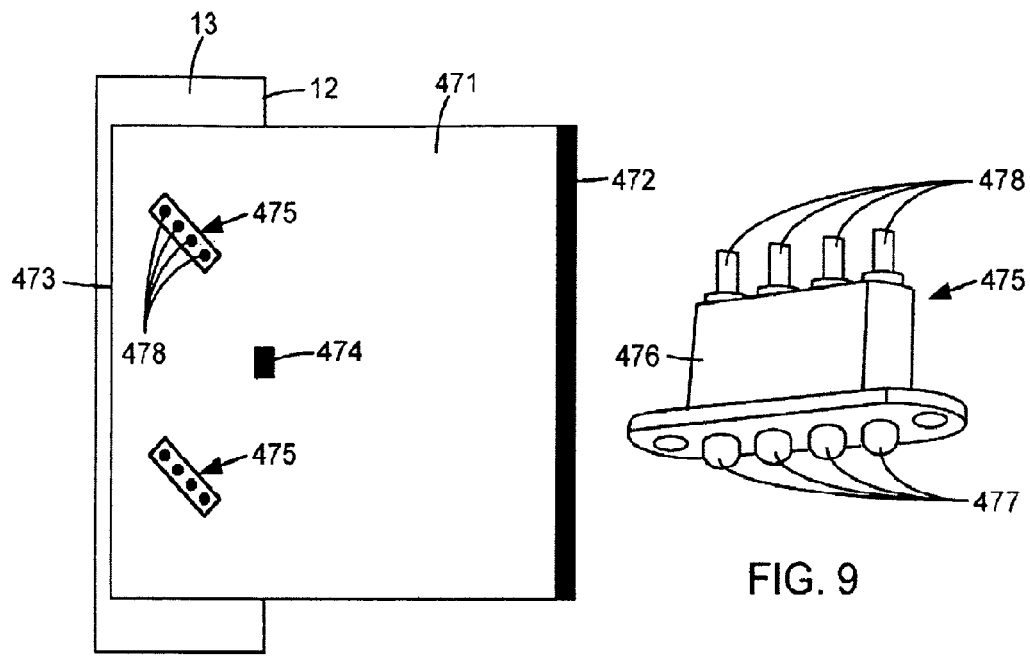
FIG. 8
FIG. 9
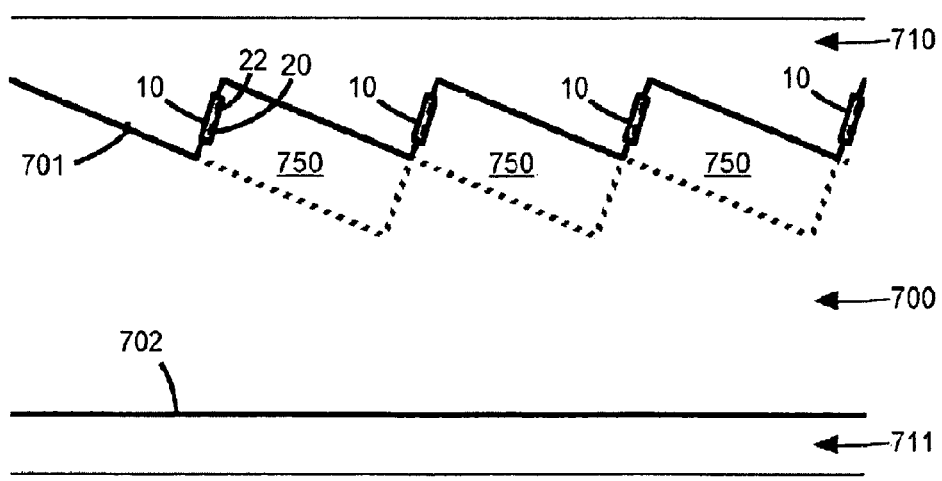
FIG 13

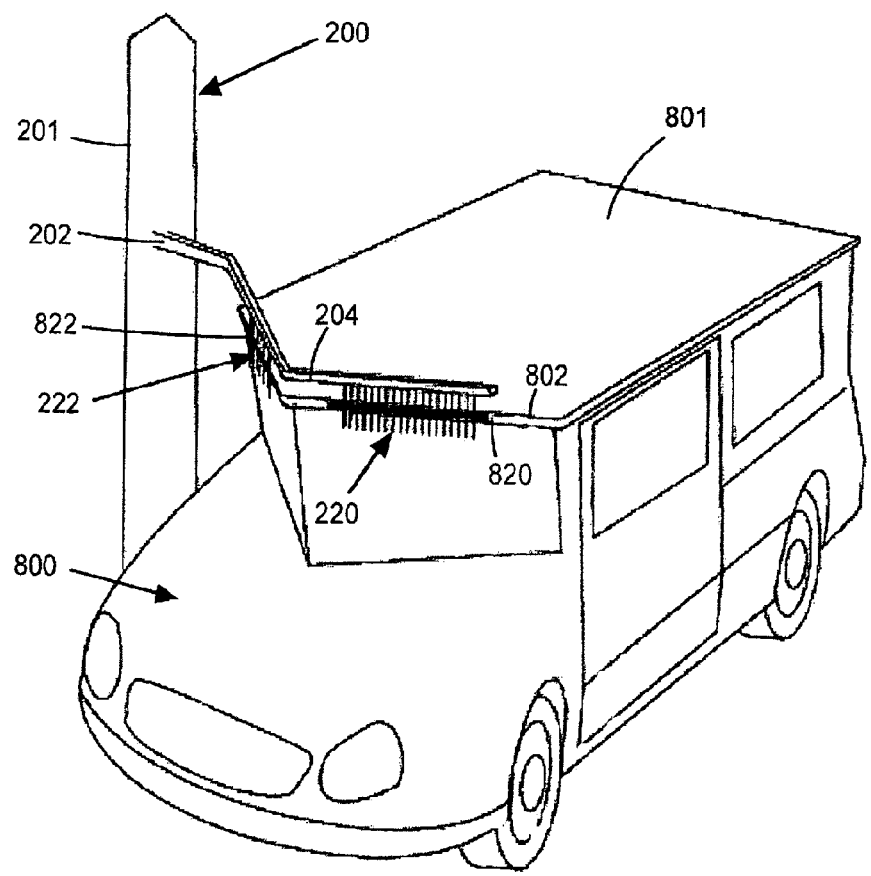
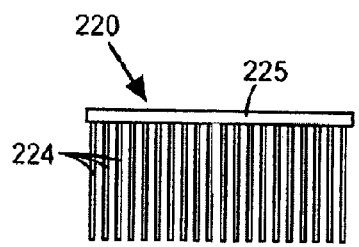
FIG. 15
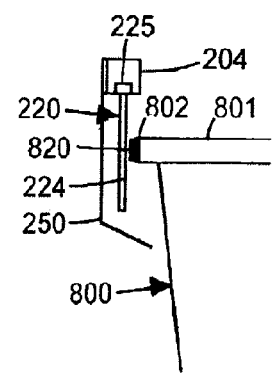
FIG. 16
FIG. 14

DOCKING BAY FOR CONDITIONALLY SUPPLYING BATTERY RECHARGING ENERGY TO A VEHICLE UTILIZING NON PLUG-IN ELECTRICAL CONTACT BETWEEN A PAIR OF DOCKING BAY CONTACTS AND A PAIR OF VEHICLE CONTACTS

CROSS-REFERENCE TO RELATED APPLICATIONS

This application is related to U.S. provisional application Nos. 61/004,602 filed Nov. 27, 2007 and 61/128,943 filed May 27, 2008, both entitled "Docking Bays For Recharging Vehicle Batteries", and both naming Gordon E. Dower as the inventor. The contents of the provisional applications are incorporated herein by reference in their entirety, and the benefit of the filing dates of the provisional applications is hereby claimed for all purposes that are legally served by such claim for the benefit of the filing date.

TECHNICAL FIELD

The present invention relates to docking bays for vehicles having a rechargeable battery and which facilitate recharging of the battery. While the invention is considered particularly suitable for electric vehicles, it is not considered as limited to such vehicles.

Herein, it is to be understood that the term "battery" includes a battery having any number of battery cells, and also includes battery packs which can be viewed as comprising one or more batteries connected to one or more other batteries.

BACKGROUND OF THE INVENTION

Commonly, if the battery in an electric vehicle is to be recharged (and the need to do so can be frequent), then it is necessary to manually connect a power cable between the vehicle and an available energy source. In the U.S.A., the most common practice appears to be to have a power cable at an electric outlet or charging station to plug into the vehicle. In various other jurisdictions including Europe, the practice appears to be the other way around. A power cable for recharging is carried in the vehicle, to be unfolded and plugged into the charging station. This is less convenient, but it lessens the possibility of having the cable stolen. In any case, the use of a power cable undesirably requires the motorist to conscientiously plug in the vehicle at appropriate times and places, even if he or she is in hurry, even if the weather is inclement, and even if he or she is disabled or has their mind on other matters.

Although various bay docking bay arrangements which do not require a manual connection have been proposed, they are relatively complicated in structure and can require substantial protection for electrical contact elements of the vehicle and/or the vehicle docking bay. Also, they can be particularly prone to vandalism unless they are located in a secure environment such as a garage or gated community.

Accordingly, there is a need for a docking bay for recharging vehicle batteries which is relatively uncomplicated, user friendly, and which can be made robust to minimize possible damage by a vehicle, vandals or other sources.

BRIEF SUMMARY OF THE INVENTION

In a broad aspect of the present invention, there is provided a docking bay for supplying battery recharging energy to a vehicle having a rechargeable battery and a pair of vehicle contacts positionable to receive such energy from the docking bay. The docking bay comprises a pair of normally de-energized, unprotected, docking bay contacts for making electrical contact with the vehicle contacts when the vehicle is driven into the docking bay, a contact energizer, and a controller. The energizer has an output operatively connected to the docking bay contacts and an input connectable to an external source of energy, and is switchable in response to an energizer control signal from a first state where battery recharging energy is not provided to the docking bay contacts to a second state where battery recharging energy derived from the external source of energy is provided to the docking bay contacts. The controller is operatively connected to the energizer for conditionally providing the energizer control signal to the contact energizer.

The controller comprises a proximity sensor for sensing proximity of the vehicle contacts to the docking bay contacts and, in response thereto, provides the energizer control signal to the energizer if a predetermined required proximity between the vehicle contacts and the docking bay contacts has been achieved. The required proximity may be as little as zero (viz. requiring actual physical contact between the contacts) or some predetermined distance greater than zero. However, the predetermined distance should be relatively small. Otherwise, if the docking bay contacts becomes energized while the vehicle with its contacts remains a significant distance away from the docking bay, the energized contacts may present an electrical hazard.

Proximity, including actual physical contact, may be recognized by various known means. For example, wireless techniques have been developed to recognize the proximity of one object to another. In the case of the present invention, one of such objects is the vehicle (and necessarily the electrical contacts on the vehicle for receiving battery recharging energy); the other object is the docking bay. Wireless may also be used to transmit from the vehicle to the docking bay an authorizing code which may be considered particularly advantageous if use of the docking bay is limited to authorized vehicles only and it is desired to monitor and charge for usage by authorized vehicles.

In another aspect of the present invention, the controller may comprise a plurality of sensors, one of them being a proximity sensor, and a signal processor operatively coupled to the sensors and the energizer. Each sensor is for sensing the presence or absence of an associated necessary condition for providing the energizer control signal to the energizer. As well, each sensor is for providing as an output an associated command signal if the associated necessary condition is satisfied. The signal processor is for receiving the command signals as an input and for providing the energizer control signal as an output if all of the associated command signals are received.

Other than the condition of proximity sensed by the proximity sensor, the necessary conditions which may be sensed by one or more additional sensors will generally depend on where the docking bay is installed and how its usage is to be managed. For example, an additional sensor may comprise means for receiving an authorization signal transmitted from the vehicle that the vehicle is authorized to receive energy from the docking bay. The sensor may then include a receiver for receiving and analyzing the transmitted signal and provide its associated command signal only if the required authorization signal is received. Alternately, for example, an additional sensor may be part of a radio frequency identification (RFID) system which reads a coded tag carried by an approaching vehicle, and which provides a command signal if the tag is recognized. RFID systems for vehicles are well known. Typically, the signals which they produce are used to open a gate or a door if the vehicle is an authorized vehicle.

As another example, an additional sensor may receive its input from an automatic pay station or cashiering terminal signifying that some amount of money has been paid or that credit has been advanced thereby authorizing the vehicle to draw energy from the docking bay. The station or terminal may be enhanced with means for monitoring the amount of energy provided by the docking bay such that the sensor provides its associated command signal only so long as the value of the energy withdrawn does not exceed the amount paid or the credit advanced.

In a preferred embodiment, each of the docking bay contacts has an exposed contact surface which is substantially flat. The surfaces lie in substantially the same plane, facing obliquely upward, and are positioned to allow corresponding contacts mounted unobtrusively beneath the vehicle, facing obliquely downward, to make sliding contact therewith.

Docking bays in accordance with the present invention may have a simple low profile outward shape, the only visible elements being the exposed docking bay contacts and the underlying support for such contacts. A low profile docking bay enables the front end portion of a vehicle to extend forwardly over the docking bay and will be suitable not only for private use by individual users but also for public use by any user who has a suitably equipped electric vehicle.

It is noteworthy that low profile docking bays advantageously may form part vehicle curbs. For example, low profile docking bays in accordance with the present invention may be integrated with bumper curbs or wheel stops often provided with parking stalls in public parking lots. Likewise, they may be integrated with curbs along the sides of streets which provide stalls for diagonal parking, In another aspect of the present invention, there is provided a docking bay for a vehicle having a rechargeable battery and a pair of vehicle contacts positioned at the forward end of a roof of the vehicle, the docking bay for supplying battery recharging energy to the vehicle and comprising an overhead support arm and a pair of normally inactive, unprotected, electrical contacts positioned on the support arm for making electrical contact with a corresponding pair of electrical contacts mounted on the front end of a roof of the vehicle when the vehicle is driven into the docking bay. The docking bay includes an energizer and controller as described above. The docking bay may comprise a vertically extending post with the overhead support arm extending horizontally from the post. Conveniently, a plug-in electrical outlet may be located on the post for providing an independent source of battery recharging energy.

The foregoing case where the electrical contacts of the docking bay are positioned on an overhead support arm as opposed to a low profile structure such as that previously described recognizes that in some environments an excessive amount of snow, ice, etc. may interfere with the serviceability of a low profile structure. While a structure with an overhead support arm mitigates this problem, it may is more susceptible to damage from vandalism or otherwise. Thus, there is a trade off which may have to be made. The use of an overhead support arm recognizes that battery electric vehicles may be provided with substantially flat roofs to provide a maximum area for solar panels. Electrical contacts to enable battery charging may be readily mounted on the front of such roofs.

For a more complete understanding of the present invention, reference should now be had to the embodiments shown in the accompanying drawings and described below.

BRIEF DESCRIPTION OF THE DRAWINGS

FIG. 3 is a side elevation view similar to FIG. 2 with the vehicle now parked in the docking bay.

FIGS. 4 and 5 illustrate in more detail and partially in section the contact support forming part of the vehicle shown in FIGS. 2 and 3.

FIG. 8 is a top view of the contact support shown in FIGS. 6 and 7 when the flap is in the position shown in FIG. 7. FIG. 8 also shows a pair of contact modules carried by the support.

FIG. 9 is a perspective view illustrating in more detail one of the two contact modules shown in FIG. 8.

FIG. 13 is a representational top view of a street including a number of diagonal parking stalls on one side of the street, each parking stall including a docking bay like that shown in FIG. 1.

FIG. 14 is a perspective view of a non low profile vehicle docking bay in accordance with the present invention and of a vehicle docked in the docking bay.

FIG. 15 is a front elevation view showing in more detail one of the docking bay contacts shown is FIG. 14.

FIG. 16 is an elevation view of a portion of the docking bay shown in FIG. 14 and of a portion of the vehicle shown in FIG. 14.

DETAILED DESCRIPTION OF THE INVENTION

Figure 1:
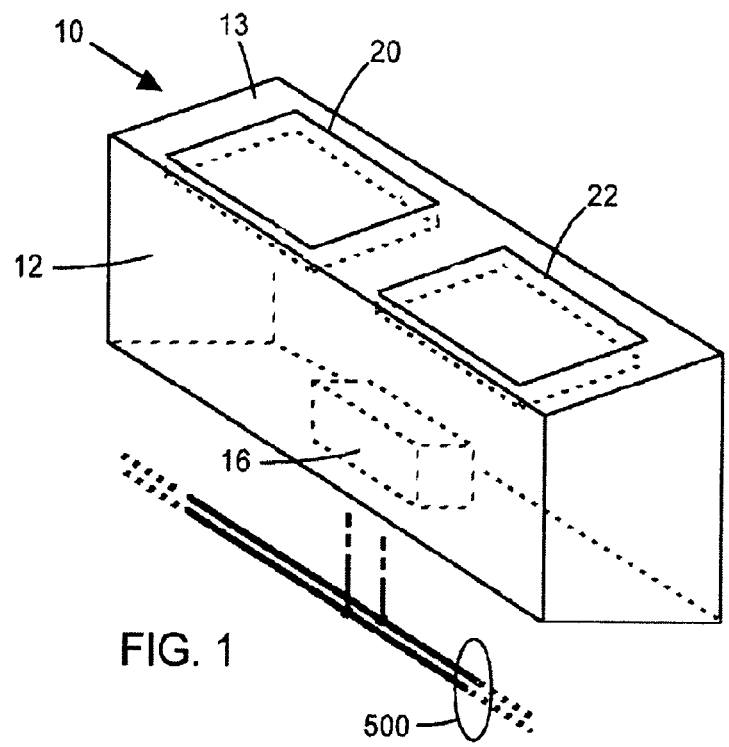
FIG. 1 is a perspective view of a vehicle docking bay in accordance with the present invention. Other than the unprotected docking bay contacts and an external source of power, electrical components and wiring are not shown in this figure.

Referring now to FIG. 1, there is shown a vehicle docking bay generally designated 10 which comprises a pair of normally inactive, unprotected, electrical contacts 20, 22 firmly mounted side by side and sealed into the sloped upper surface 13 of a support 12. Support 12 is formed from electrically insular material. Contacts 20, 22 are robust in character, for example being fabricated from bronze. Their flat upper surfaces face obliquely upward and are substantially coplanar with each other and with upper surface 13. Typically, support 12 may rest on a ground or floor surface (not shown in FIG. 1).

Docking bay 10 includes an electrical compartment 16 which contains various components which are described hereinafter. Operationally, components within the compartment are electrically interposed between an external source of power 500 and contacts 20, 22. As shown in FIG. 1, compartment 16 is housed within support 12. However, it will be understood that it may be located outside of the support so long as necessary wiring extends from components in the compartment to the support and then on to contacts 20, 22.

In use, docking bay 10 is wired to external source of power 500 which, for example, typically may provide power to the docking bay at 120 VAC or 240 VAC from an AC power grid or utility. As indicated in FIG. 1, this power is supplied from beneath support 12 (e.g. from underground or from below a floor), but this not essential. Also, and as will be obvious to those skilled in the art, a range of other AC voltages may be used. Further, in principle, the external source of power may be a DC power source provided that appropriate power conditioning well known to those skilled in the art is used. Ultimately, whatever the source of power may be, the received power will be conditioned as described below for the purpose of battery charging.

Figure 2:
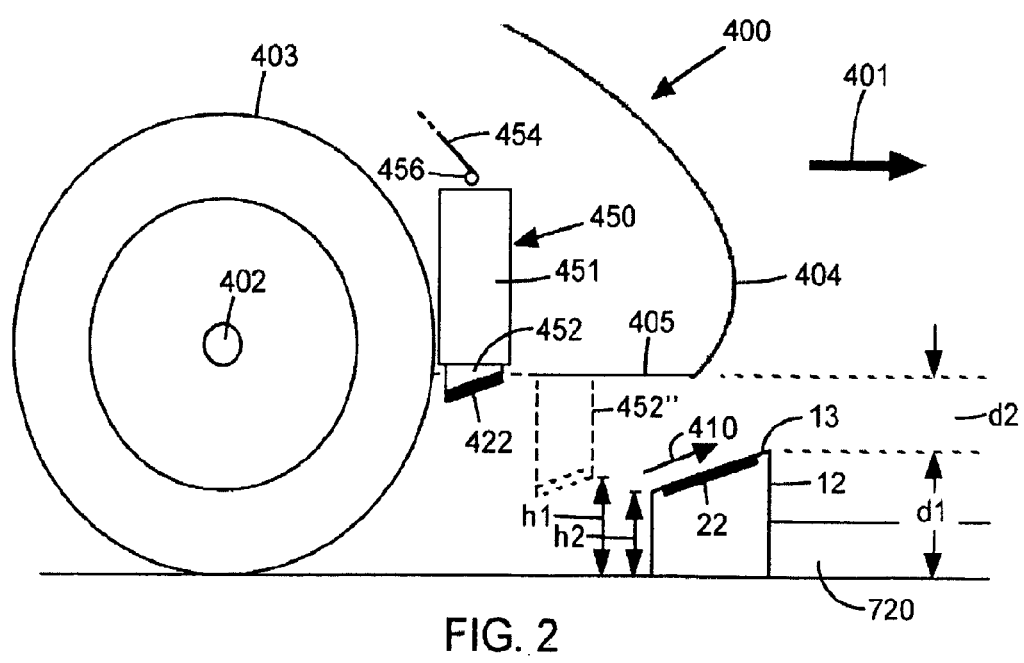
FIG. 2 is a representational side elevation view of the docking bay shown in FIG. 1 and of a vehicle approaching the docking bay.

In FIG. 2, a vehicle 400 is shown as it approaches docking bay 10 in the direction of arrow 401. In FIG. 3, the vehicle has moved forward to a parking position in the docking bay.

Vehicle 400 includes a rechargeable battery (not shown in FIGS. 2 and 3), a front axle 402 of road wheel 403, and a front end 404 having a lowermost front portion 405 extending rearwardly from the front end. As well, the vehicle includes a pair of electrical contacts 420, 422 each of which is carried by an associated contact support generally designated 450 which forms part of the vehicle and is located between front axle 402 and front end 404. Only one of the supports 450 and contact 422 is visible in FIGS. 2 and 3, the other support and contact 420 being hidden from view behind the visible support. Contacts 420, 422 may be fabricated from various conductive materials. For example, one option is bronze as mentioned above for the docking bay contacts. Another example is carbon material such as that used for electric trolley buses.

Contact supports 450 are located on either side of the vehicle centerline so that contacts 420, 422, facing obliquely downward, are able to make electrical contact by abutment with contacts 20, 22 of docking bay 10. To compensate for possible lateral misalignment as the vehicle is driven into the docking bay, it is desirable that the dimensions of the vehicle contacts transverse to the direction of arrow 401 be less than the width of the docking bay contacts. Further, to avoid the possibility of short circuiting the docking bay contacts, it is desirable that the dimensions of the vehicle contacts transverse to the direction of arrow 401 be less than the distance between the docking bay contacts.

As illustrated in more detail in FIGS. 4 and 5, contact support 450 comprises a housing 451 and a plunger 452 slidable upwardly and downwardly relative to the housing from a fully retracted position as shown in FIGS. 2 and 4 to a deployed position as shown in FIGS. 3 and 5. Both the housing and the plunger are generally cylindrical. Contact 422 is secured to the bottom of the plunger. Upward movement of plunger 452 is limited by a plug 453 threadingly engaged into the top of the housing. Downward movement is limited by a cable 454 which extends downwardly over guide 456, through central opening 457 in plug 453, and along the cylindrical axis of the housing and the plunger to a distal end secured at 458 to interior wall 459 of the plunger.

Contact support 450 further includes a compression spring 460 which is secured at its top end to the bottom wall of plug 453 and at its bottom end to interior wall 459 of plunger 452. In the position shown in FIG. 4 where plunger 452 is fully retracted, spring 460 is maximally compressed. This is the normal position when vehicle 400 is away from docking bay 10. The position is maintained by drawing cable 454 upwardly and holding it against the downward force which results from the urging action of spring 460 on interior wall 459 of the plunger. In the position shown in FIG. 5, the hold on cable 454 has been released sufficiently to enable plunger 452 under its own weight and the urging of spring 460 to move downwardly in housing 451 to a position where vehicle contact 422 makes electrical contact with the exposed surface of docking bay contact 22 as shown in FIG. 3. In this position, spring 460 remains partially compressed so that the abutment between contact 422 and contact 22 is maintained with a degree of force by the action of the spring.

In the absence of any external structure to limit downward movement of plunger 52 when cable 454 is released, the amount of such movement should be largely determined by the characteristics of spring 460, but friction between the outer wall of the plunger and the inner wall of housing 451, and the weight of the plunger, may play a limited role. In any case, the upper end of plunger 452 should remain within housing 451 when the plunger is in its maximum downward position. Further, and now with reference to FIG. 2 which illustrates in broken outline the plunger (now designated 452") when fully deployed in its maximum downward position, the height h1 of the forward leading edge of the plunger should be greater than the height h2 of the facing leading edge of docking bay support 12. Then, as vehicle 400 approaches the docking bay with the plunger fully deployed, vehicle contact 422 will wedge against and slide up along the oblique surface of support 12 and contact 22 of the docking bay in the direction of arrow 410, ultimately achieving full abutment contact with contact 22. Though not indicated in FIG. 2, contact 420 likewise wedges against and slides up along the surface of support 12 and contact 20, ultimately achieving full abutment contact with contact 20.

The foregoing wedging and sliding action is facilitated by the spring mounting of plunger 452. While such action and spring mounting is not considered essential to the present invention, it is considered desirable. More particularly, it will be understood that effective abutment contact between contacts 20, 22 and 420, 422 is a fundamental requisite to enable power flow from the docking bay to the vehicle 400. However, given docking bay 10, it will be equally understood that such contact may be achieved by a variety of means and not the means just described. In principle, even if contacts 420, 422 were in a static position on vehicle 400, but were properly elevated relative to docking bay 10, then desired contact abutment could be achieved simply by driving the vehicle into the docking bay. However, this ideal can be compromised by various practical considerations.

Firstly, it may occur that contacts 420, 422 on vehicle 400 are covered with dirt, ice or other foreign matter which may impair an effective electrical contact with contacts 20, 22 on the docking bay. With a wedging and sliding action as described above, a cleaning action can usefully result between the docking bay contacts and the vehicle contacts as the vehicle is driven into the docking bay. The cleaning action on the vehicle contacts may be enhanced by roughening at least a part of surface 13 which lies in advance of contacts 20, 22 or by roughening a leading part of the surfaces of contacts 20, 22 themselves. Such roughened surfaces can serve to scrape away foreign matter on the surfaces of contacts 420, 422.

Secondly, it may occur that the height of vehicle contacts 420, 422 is not ideally positioned or is not always ideally positioned relative to docking bay contacts 20, 22. The height of the vehicle contacts may vary depending on factors such as the load being carried by the vehicle and tire pressures. Similarly, it is possible that the height of the docking bay contacts may vary somewhat, either in an absolute sense (e.g. because of limited quality control in the manufacture of the docking bay) or in a relative sense (e.g. because of limited quality control during installation of the docking bay—leaving one end of the docking bay a bit lower than the other relative to the road surface on which the vehicle is traveling. Within limits, the spring mounting of the vehicle contacts will compensate for such variances.

With regard to the possibility of icing as noted above, a further or alternative way to deice contacts 420, 422 is to provide heating elements in proximity to the contacts and to provide power to the heating elements when required. The same may be said with respect to docking bay contacts 20, 22 which, under certain environmental conditions, may be prone to icing up. Heating elements placed in proximity to contacts 20, 22 and powered from grid or utility 500 could be used to alleviate the problem when it arises. It will be noted that the provision of power to heating elements for the vehicle contacts or for the docking bay contacts may be thermostatically controlled by well known means.

It will be understood that docking bay 10 can be characterized as having a low profile. More particularly, and as shown in FIG. 2, support 12 has a maximum height d1 which allows lowermost front portion 405 of vehicle 400 to pass with a clearance d2 above the support when vehicle 400 is driven into the docking bay in the direction of arrow 401. Further, and although not essential, it will be noted from FIG. 2 that docking bay 10 may be abutted against a structure such as walkway 720. It may then perform the additional function of acting as vehicle curb.

Further, it will be understood that there are a wide variety of arrangements which any given vehicle may have in order to make effective use of a low profile docking bay such as docking bay 10. The use of means such as contact support 450 described above is but one option. Another option, and one which is considered to be particularly simple to implement, is a vehicle contact support such as that illustrated in FIGS. 6 to 8.

Figure 6:
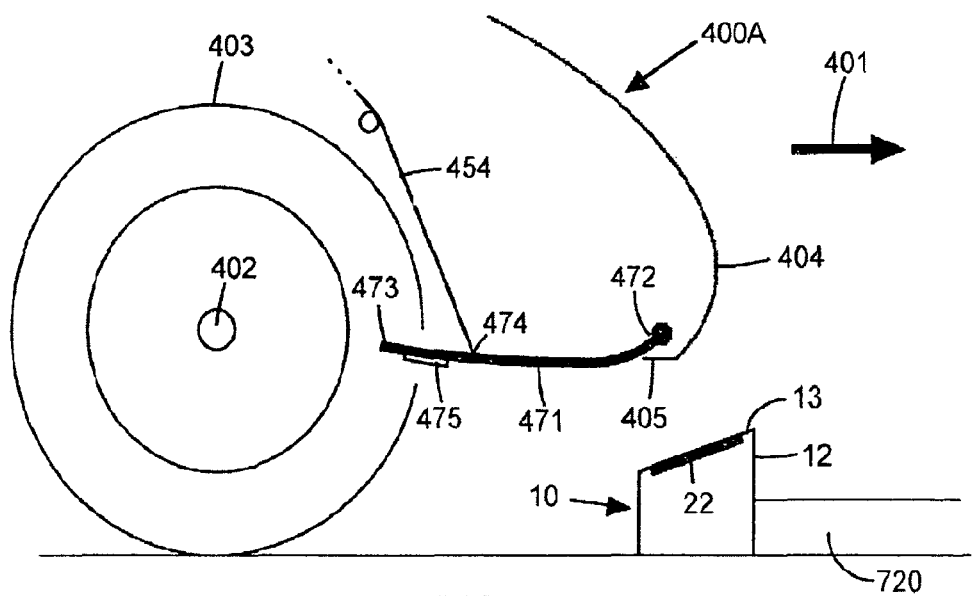
FIGS. 6 and 7 are representational side elevation views similar to FIGS. 2 and 3 but with a flap of flexible material being used by the vehicle as a contact support.
Figure 7:
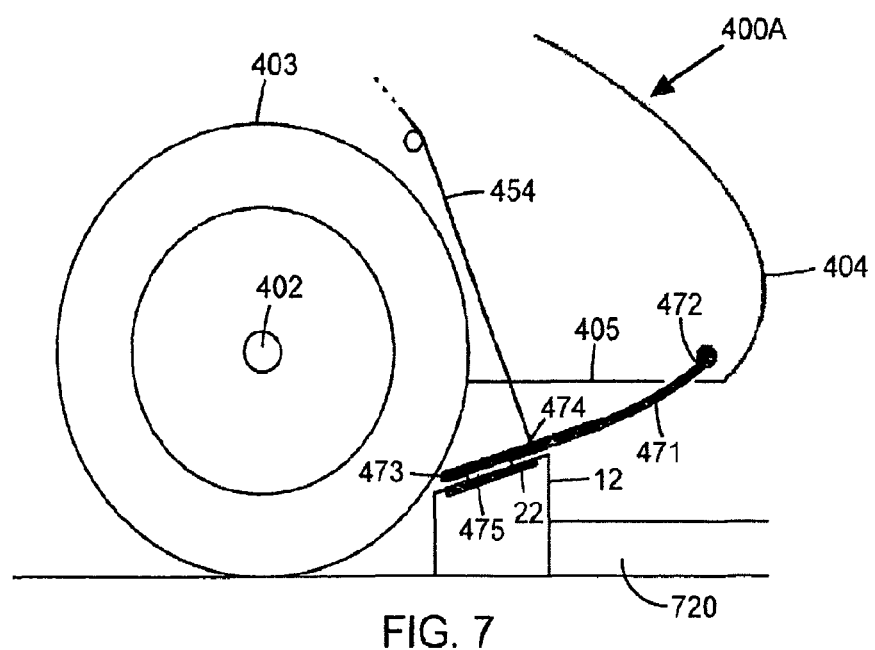

The vehicle contact support shown in FIGS. 6 to 8 is part of the vehicle generally designated 400A and comprises a deployable flap 471 of flexible material which extends from a hinged forward or proximal end 472 to a trailing or distal end 473. Raising and lowering the flap about proximal end 472 is managed by pulling on or releasing cable 454 which is secured centrally widthwise of the flap 471 at 474. Various rubber-like materials are suitable for flap 471. By way of example, neoprene mat material having a thickness of about 15 mm and a durometer of 60 is considered suitable. Such mat material is commercially available and can be cut lengthwise and widthwise to a desired size.

In more detail, a pair of electrical contact modules 475, also forming part of vehicle 400A, are mounted to flap 471—one for making abutment contact with electrical contact 20 of the docking bay; the other for making abutment contact with electrical contact 22 of the docking bay. While the structure of contact modules 475 is not considered critical, the structure illustrated representationally in FIGS. 6 to 8 and in more detail in FIG. 9 is considered advantageous. Module 475 as illustrated in FIG. 9 is commercially available, for example from Painless Performance, 2501 Ludelle St., Fort Worth, Tex. 76105, and is identified as Jamb Tac™ Connector Part No. 40024. It is easily mounted to flap 471 made from neoprene material as described above. This connector comprises a housing 476 and four brass button contacts 477 which are spring loaded (not shown) and which project from the bottom of the housing to terminals 478 above the top of the housing. In a vehicle, required wiring connections are easily made to terminals 478.

Jamb Tac™ connectors are not limited to four button contacts per module and, in conjunction with the present invention, it should be understood that it is not essential to use a module with four button contacts. Jamb Tac™ connectors with one, two, three and five button contacts per module are also available. To engage contacts 20, 22 of docking bay 10, the modules used may be arrayed and organized in any desired pattern.

It appears that Jamb Tac™ connectors were originally designed for installation in vehicle door jambs to break and make electrical connections depending on whether the door is open or closed. However, despite this differing purpose, they are well suited for use in conjunction with the present invention. They are rated to carry significant currents (viz. 60 amps) and are easy to mount on a flexible flap such as flap 471.

As shown in FIG. 6, flap 471 has been pulled by cable 454 upwardly to a substantially horizontal position which is the normal position when vehicle 400A is away from the docking bay. When the pull on cable 454 is relieved, flap 471 lowers to the position shown in FIG. 7 where vehicle 400A is now docked. Downward movement of flap 471 has been limited by support 12 of the docking bay.

When downward movement of flap 471 is not limited by support 12 of the docking bay, the flap should be lowerable to an angle which is greater than the slope of upper surface 13 of the docking bay. Then, as vehicle 400A approaches the docking bay with button contacts 477 of modules 475 fully deployed, the flap and the contacts will drag up and across surface 13 and the surfaces of contacts 20, 22. The dragging action will tend to scrape the contact points of contacts 477 clean of foreign debris which may collect on the contact points.

In accordance with the present invention, various means for energizing the contacts of a docking bay are envisaged. The particular means will depend on various factors including the nature of the power supplied to the docking bay from an external source of power, the nature of the power to be supplied by the docking bay to the vehicle whose battery is to be recharged when the docking bay contacts are energized, and on the desired circumstances which determine when the docking bay contacts should be energized.

Example 1

Figure 10:
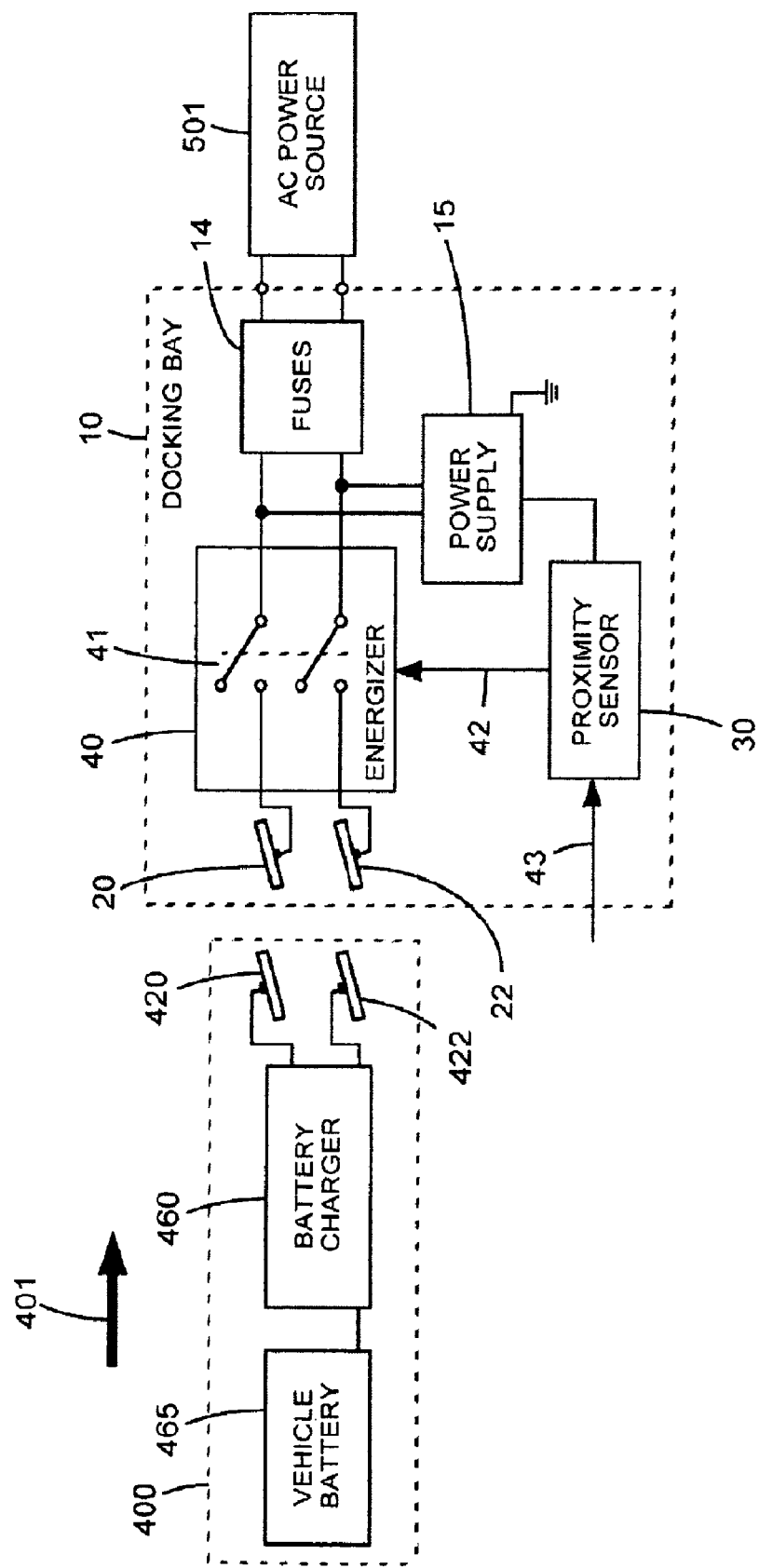
FIG. 10 is a representational block diagram view of a vehicle approaching a docking bay in accordance with the present invention. The vehicle includes an on board battery charger and the docking bay contacts are energized if a proximity condition is satisfied.

FIG. 10 illustrates a basic case where docking bay 10 is wired to an external AC power source 501 and where vehicle 400 carries an on-board battery charger 460 for recharging a vehicle battery 465. Battery charger 460 is a conventional battery charger adapted to receive an AC power input and to provide in response thereto a suitably controlled charging current to battery 465.

In this example, and in addition to docking bay contacts 20, 22, the operative components of docking bay 10 comprise protective fuses 14, a power supply 15, a proximity sensor 30, an energizer 40, and electrical wiring. Except for contacts 20, 22 and wiring which extends thereto from energizer 40, all of such components may be contained within electrical compartment 16 mentioned above.

Energizer 40 comprises a normally open, double-pole double-throw (DPDT) switch or relay 41 which is switchable in response to an energizer control signal received on line 42 from a normally open position where contacts 20, 22 are de-energized to a closed position where contacts 20, 22 are energized with power from source 501. As depicted, relay 41 is an electromechanical relay. Of course, it may be a solid state electronic relay.

As will be understood by those skilled in the art, a DPDT switch such as relay 41 is not essential. For example, in cases where the external source of power is an AC power source, a single pole double throw switch can suffice. One input line may be an AC "hot" voltage line; the other may be an AC voltage "neutral" line. However, it is not essential that both the hot and neutral lines be switched. The hot line should be switchable, but the neutral line need not be switchable and may be connected directly to one of the docking bay contacts without passing through relay 41.

Proximity sensor 30 which receives operating power from power supply 15 acts as a controller for conditionally providing the energizer control signal as an output on line 42 to energizer 40. When contacts 420, 422 of vehicle 400 are in sufficient proximity to docking bay contacts 20, 22 as sensed by proximity sensor 30 from the input received on line 43, then the sensor activates to provide the necessary control signal on line 42. In turn, through energizer 40, contacts 20, 22 then become energized. When contacts 420, 422 are in physical contact with contacts 20, 22, energy then becomes available to battery charger 460.

Example 2

Figure 11:
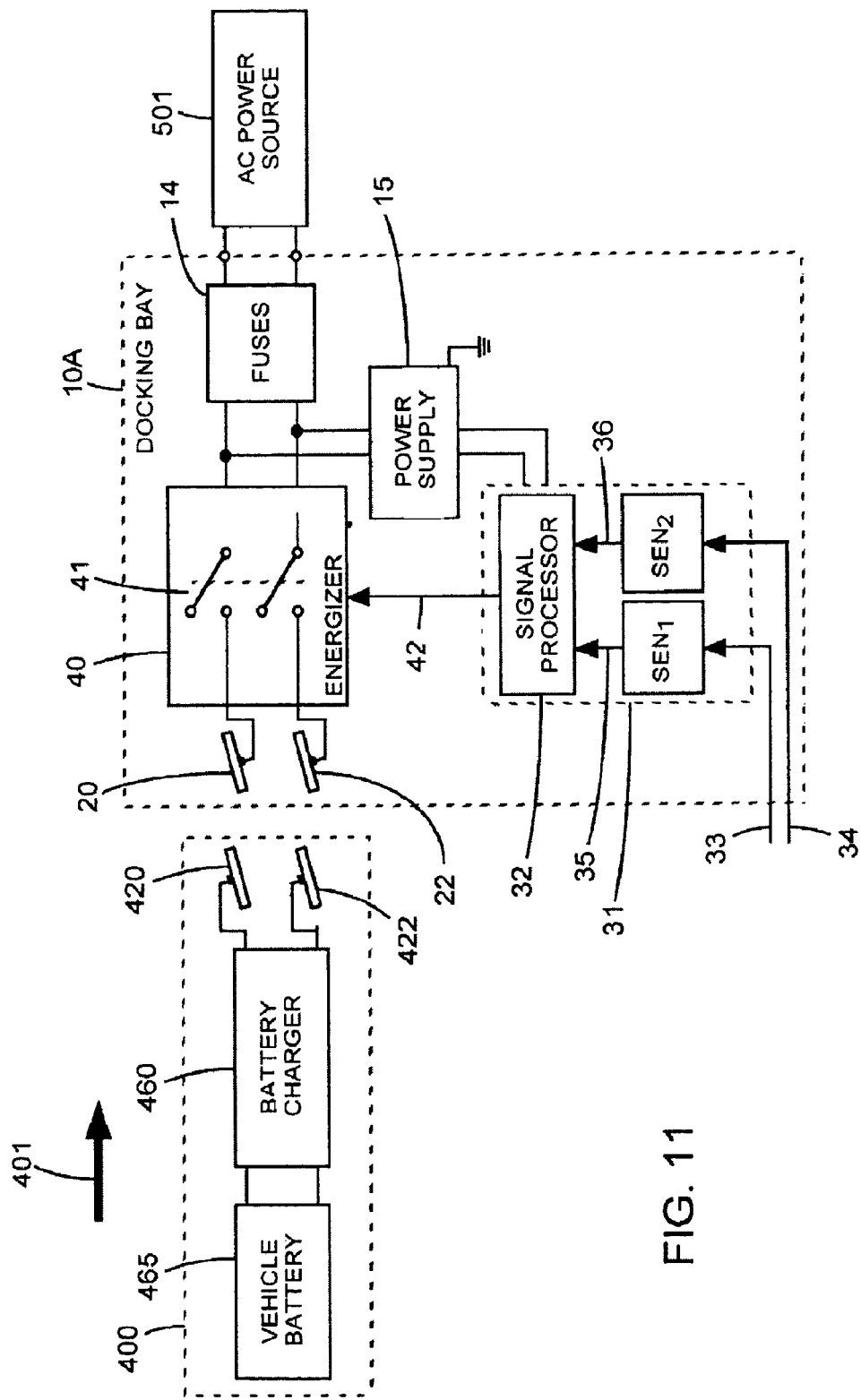
FIG. 11 is a representational block diagram view of a vehicle approaching another docking bay in accordance with the present invention. The vehicle includes an on board battery charger and the docking bay contacts are energized if a plurality of necessary conditions including a proximity condition are satisfied.

FIG. 11 illustrates a case which is similar to that shown in FIG. 10. The docking bay, now labelled 10A, utilizes fuses 14, a power supply 15, and an energizer 40 as in the case of the embodiment shown in FIG. 10. Also the closure of relay 41 requires receipt of an energizer control signal on line 42. However, unlike docking bay 10 where the energization of docking bay contacts 20, 22 is controlled by proximity sensor 30, their energization is now controlled by a controller 35 comprising a plurality of sensors (in this case two sensors) SEN$_1$, SEN$_2$ and a signal processor 36.

Sensor SEN$_1$ is for sensing on input line 33 the presence or absence of an associated necessary condition for providing an energizer control signal to energizer 41 and for providing on output line 35 an associated command signal if the associated necessary condition is satisfied. Likewise, sensor SEN$_2$ is for sensing on input line 34 the presence or absence of another associated necessary condition for providing the energizer control signal to energizer 41 and for providing on output line 36 an associated command signal if the associated necessary condition is satisfied. Signal processor 32 which may be implemented with logic circuitry is operatively coupled to the sensors and the energizer for receiving the command signals as an input on lines 35, 36 and for providing the energizer control signal as an output to the energizer on line 42 if all of the associated command signals are received.

In accordance with the present invention, one of the two sensors should be a proximity sensor such as proximity sensor 30 but with its output going to signal processor 32 instead of energizer 41 as in FIG. 10. The other of the two sensors may be designed to sense a desired further condition which must be satisfied before contacts 20, 22 can become energized. Examples of functions which may be performed by an additional sensor are discussed above. If more than two necessary condition must be satisfied before contacts 20, 22 can become energized, then obviously suitable sensors in addition to those shown in FIG. 11 may be employed.

Example 4

Figure 12:
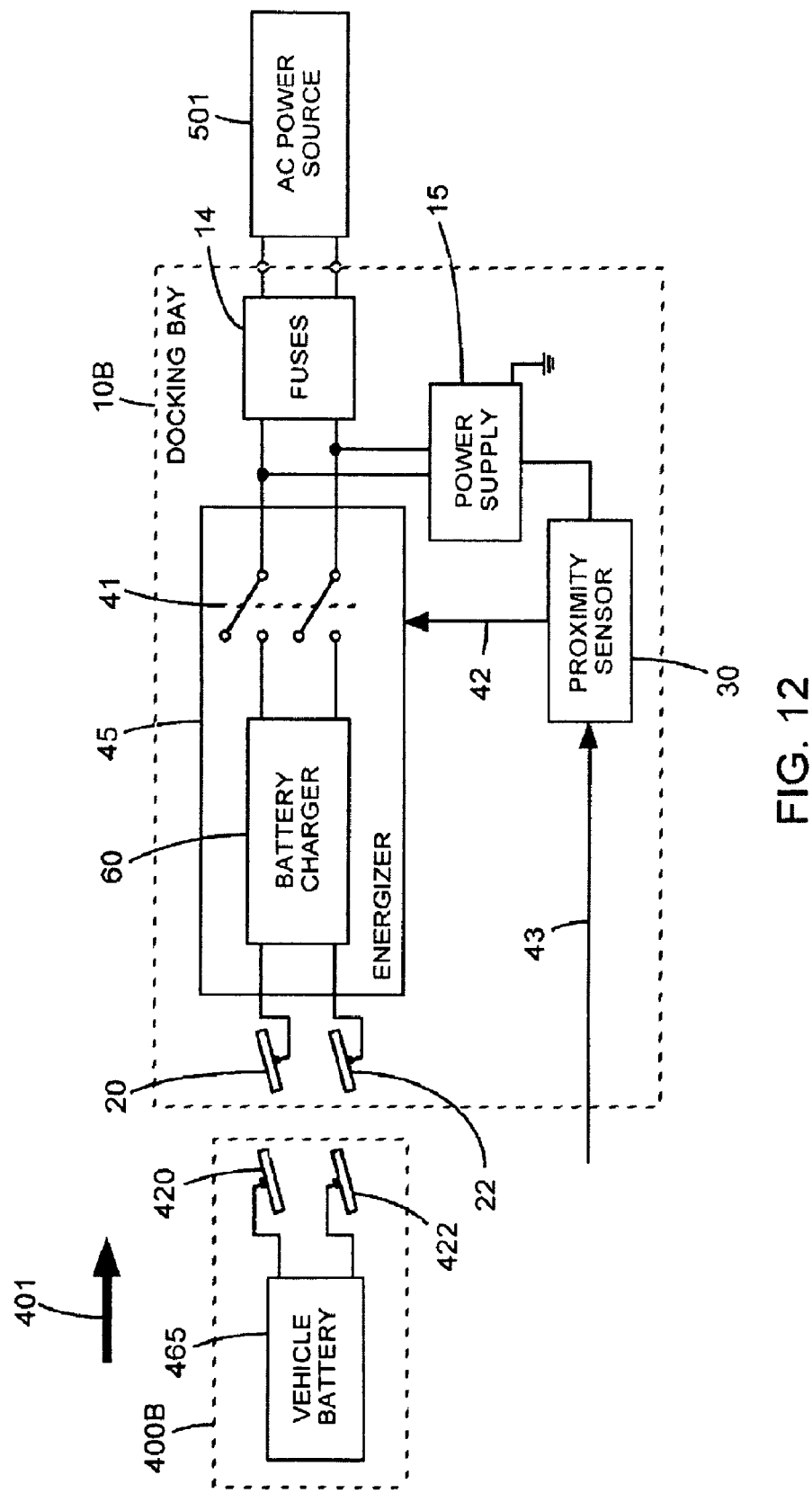
FIG. 12 is a representational block diagram view of a vehicle approaching yet another docking bay in accordance with the present invention. In this case, the vehicle does not carry an on board battery charger.

FIG. 12 illustrates a case similar to that shown in FIG. 10 except that the vehicle, now labelled 400B, does not carry an on-board battery charger. Here, a battery charger 60 is included as part of the docking bay, now labelled 10B, and more particularly as part of energizer 45 thereof. As in the case of energizer 40, energizer 45 includes a DPST switch 41 which is activated by a proximity sensor 30 when contacts 420, 422 of vehicle 400 are in sufficient proximity to docking bay contacts 20, 22. When activated, battery charger 60 receives an AC input from power source 501 and delivers a battery charging output from energizer 45 to contacts 20, 22.

Docking bay 10B may be considered suitable for vehicles other than electric vehicles—for example, internal combustion vehicles which include a relatively small battery for the purpose of engine start-up. Such batteries sometimes require a recharge and the embodiment shown in FIG. 12 can be used for this purpose provided that the vehicle is suitably equipped with contacts such as contacts 420, 422. However, and as will be understood by those skilled in the art, the output from battery charger 60 must have regard to the characteristics of battery 465 in vehicle 400B. While the majority of vehicle batteries used for engine start-up are rechargeable lead acid batteries, some are not. For example, some are rechargeable nickel cadmium batteries. A battery charger which is suitable for charging a lead acid battery may not be suitable for charging a nickel cadmium battery.

Example 5

In the above examples, the external power source is an AC power source. However, even though it may rarely occur in practice, the external source of power may be a DC source of power. In such a case, the matter can be handled in various ways. For example, if the external source of power for the embodiment shown in FIG. 10 was a DC power source, and assuming that on-board battery charger 460 expected to receive an AC input, then those skilled in the art will appreciate that a suitable DC-AC inverter (not shown) could be interposed as part of energizer 40 between the output of switch 41 and contacts 20, 22. In principle, an inverter might be interposed at the input to switch 41, but this may be considered undesirable because the inverter could consume energy whether or not there was a battery to be charged.

Example 6

In the embodiments discussed thus far, energy is transferred in one direction only from an external source of power, through an energizer in the vehicle docking bay, and to the vehicle. However, a docking bay which includes features enabling energy transfer in the one direction from an external source of power to a vehicle may also include added features enabling the transfer of energy in the opposite direction from the vehicle to external power lines which may be de-energized by reason of a power failure or, for example, to supplement power in a grid which is energized.

Diagonal Parking Stalls

The present invention is well adapted for use in conjunction with diagonal parking stalls. Referring to FIG. 13, there is shown a street generally designated 700 with a saw-toothed curb 701 on one side of the street and a straight curb 702 on the other side. Merely for the purpose of illustration, sidewalks generally designated 710, 711 are depicted on either side of the street.

FIG. 13 also illustrates a plurality of diagonal parking stalls 750, each being indicated in broken outline in relation to saw-toothed curb 701. A low profile docking bay 10 like that shown in FIG. 1 is positioned at the inner end of each parking stall. For this diagonal layout of parking stalls, the present invention is advantageous and is well adapted to integrate with the layout because in many locales vehicles may be parked during the day or overnight in unreserved diagonal parking stalls. If the parked vehicles are electric vehicles, then it will be desirable to have a battery recharging facility such as docking bay 10 with a low profile at the inner end of each parking stall. Generally, it is contemplated that wiring from an external source of power to such docking bays will extend below ground level for all docking bays.

Non-Low Profile Docking Bays

While preferable and advantageous in many circumstances, the present invention is not limited to docking bays having a low profile. Referring now to FIG. 14, there is shown a vehicle docking bay generally designated 200 comprising a vertically extending post 201 and an overhead support arm 202 extending generally horizontally from the post. A vehicle generally designated 800 is shown docked in the docking bay and includes a roof 801 which has a V-shaped front end 802. A pair of electrical contacts 820, 822 are mounted on opposed sides of front end 802. These contacts may be carbon, bronze or other suitable material. If front end 802 of the roof or if roof 801 as a whole is formed from conductive material, then contacts 820, 822 necessarily will have to be insularly mounted. Vehicle 800 also includes a rechargeable battery (not shown).

Overhead support arm 202 includes a V-shaped portion 204 configured to match the shape of front end 802 of vehicle roof 801. A pair of electrical contacts generally designated 220, 222, are carried by support arm 202 and are positioned for making an electrical connection with contacts 820, 822 carried by vehicle 800 when the vehicle is driven into the docking bay. Obviously, arm 202 could be configured differently to match differently shaped vehicle roof front ends.

As best seen in FIG. 15 with the example of contact 220, the contact has a brush-like structure with a plurality of conductive rods 224 firmly set into and descending from a conductive plate 225. As best indicated in FIG. 16 which includes an end view of contact 220, plate 225 is mounted and extends longitudinally within portion 204 of arm 202. Contact 222 has substantially the same structure as contact 220, its conductive plate extending longitudinally within the opposite side of portion 204. Necessarily, the mounting of contacts 220, 222 within portion 204 must be an insular mounting unless arm 202 or at least portion 204 thereof is made from non-conducting material. Wires (not shown) extend from contacts 220, 222 through arm 202 and post 201 to receive energy from an external source which typically may be located below ground level.

Contacts 220, 222 may be made from bronze or other suitable material. The Contact rods 224 should be flexible but fairly stiff. Because the rods normally will be in full view of the driver, accurate positioning of the vehicle should be easy. A curb or other restraint against the front wheels of the vehicle may be provided to prevent the vehicle from moving too far forward. In FIG. 16, but not shown in FIG. 14, there is depicted a cover 250 mounted to arm portion 204 which extends before the face of and downwardly and below contact 220. A similar cover is provided for contact 222. These covers do not protect the docking bay contacts 220, 222 from the vehicle, but do provide a desirable shield against persons who for whatever reason might be inclined to try to touch the contacts at a time when they are energized.

The energization of contacts 220, 222 of docking bay 200 may be controlled by various means including, for example, means substantially the same as that described above which may be used to control energization of docking bay contacts 20, 22.

Various modifications and changes to the embodiments described above and those shown in the drawings are possible and undoubtedly will occur to those skilled in the art. For example, a low profile docking bay in accordance with the present invention need not have a sloped upper surface which is substantially flat as in the case of surface 13 of structure 12 shown in FIG. 1. Instead the surface may, for example, slope not only forwardly as indicated in FIG. 1 but also inwardly from each end of the docking bay to form a sloped V-shaped surface. Contacts like contacts 20, 22 placed on opposed legs of the V-shaped surface may still be used. However, their exposed contact surfaces would then face obliquely upward and inward and would lie in differing planes. Suitable orientation of the corresponding vehicle contacts would be required in order to enable required abutment with the docking bay contacts (viz. the vehicle contacts would face not only obliquely downward but also outward). As another example, the upper surface of structure 12 may be modified to include a forward part which faces obliquely upward and forward as in the case of surface 13 and a rearward part which faces obliquely upward and rearward. One docking bay contact may extend longitudinally coplanar with the forward surface; the other may extend longitudinally coplanar with the rearward surface. Again, the contacts would lie in differing planes.

Further, it should not be implied from the foregoing description that the recharging system on the vehicle may not include elements other than those mentioned above. For example, depending on the actual recharging system in particular vehicles, it may be considered desirable though not essential to include means for ensuring that vehicle contacts 420, 422 remain inactive unless within sufficient proximity to the docking bay contacts.

I claim:

1. A docking bay for supplying battery recharging energy to a vehicle having a rechargeable battery and a pair of vehicle contacts positionable to receive said energy from said docking bay, said docking bay comprising:
   (a) a pair of normally de-energized, docking bay contacts each having a fully exposed, unprotected contact surface for making a non plug-in electrical contact with said vehicle contacts when said vehicle is driven into said docking bay;
   (b) a contact energizer having an output operatively connected to said docking bay contacts and an input connectable to an external source of energy, said energizer being switchable in response to an energizer control signal from a first state where battery recharging energy is not provided to said docking bay contacts to a second state where battery recharging energy derived from said external source of energy is provided to said docking bay contacts; and,
   (c) a controller operatively connected to said energizer for conditionally providing said energizer control signal to said energizer.

2. A docking bay as defined in claim 1, wherein said controller comprises a proximity sensor for sensing proximity of said vehicle to said docking bay for providing said energizer control signal to said energizer if a predetermined required proximity has been sensed.

3. A docking bay as defined in claim 2 wherein the proximity required is physical contact between said vehicle contacts and said docking bay contacts.

4. A docking bay as defined in claim 1, wherein said controller comprises:
   (a) a plurality of sensors, each for sensing the presence or absence of an associated necessary condition for providing said energizer control signal to said energizer, and each for providing as an output an associated command signal if the associated necessary condition is satisfied; and, (b) a signal processor operatively coupled to said sensors and said energizer for receiving said command signals as an input and for providing said energizer control signal as an output if all of said associated command signals are received, wherein one of said sensors comprises a proximity sensor for sensing proximity of said vehicle contacts to said docking bay contacts.

5. A docking bay as defined in claim 2 wherein said docking bay contacts each have an exposed contact surface which is substantially flat.

6. A docking bay as defined in claim 2 wherein:
(a) said docking bay contacts each have an exposed contact surface which is substantially flat; and,
(b) said contact surfaces lie in substantially the same plane.

7. A docking bay as defined in claim 2 wherein:
(a) said docking bay contacts each have an exposed contact surface which is substantially flat; and,
(b) said contact surfaces lie in substantially the same plane and face obliquely upward.

8. A docking bay as defined in claim 2 wherein:
(a) said docking bay contacts each have an exposed contact surface which is substantially flat; and,
(b) said contact surfaces lie in differing planes.

9. A docking bay as defined in claim 2 wherein said vehicle contacts are supported by a flexible, deployable flap and wherein said docking bay contacts are oriented to make electrical contact with said vehicle contacts when said flap is deployed and said vehicle is driven into said docking bay.

10. A docking bay as defined in claim 2 wherein said docking bay has a low profile enabling a front end portion of said vehicle to extend forwardly over said docking bay.

11. A docking bay as defined in claim 10 situate on a street at the inner end of a diagonal parking stall.

12. A docking bay as defined in claim 10 forming part of a vehicle curb.

13. A docking bay as defined in claim 2 wherein said energizer has:
(a) a first mode of operation enabling the delivery of electrical energy from said external source of energy through said docking bay to said vehicle; and,
(b) a second mode of operation enabling the delivery of electrical energy from said vehicle through said docking bay to external power lines, said docking bay further comprising means for selecting the mode of operation.

14. A docking bay as defined in claim 4, wherein one of said sensors comprises means for receiving an authorization signal that said vehicle is authorized to receive energy from said docking bay and for providing its associated command signal only if such authorization signal is received.

15. A docking bay as defined in claim 2 wherein:
(a) said vehicle contacts are supported by a flexible, deployable flap;
(b) said docking bay contacts are oriented to make electrical contact with said vehicle contacts when said flap is deployed and said vehicle is driven into said docking bay; and,
(c) said docking bay has a low profile enabling a front end portion of said vehicle to extend forwardly over said docking bay.

16. A docking bay as defined in claim 2 wherein:
(a) said vehicle contacts are supported by a flexible, deployable flap;
(b) said docking bay contacts are oriented to make electrical contact with said vehicle contacts when said flap is deployed and said vehicle is driven into said docking bay; and,
(c) said docking bay is situate on a street at the inner end of a diagonal parking stall.

17. A docking bay as defined in claim 16 wherein said docking bay contacts each have an exposed, substantially flat, contact surface substantially coplanar with the other docking bay contact surface, each said surface facing obliquely upward.

18. A docking bay as defined in claim 2 wherein:
(a) said vehicle contacts are supported by a flexible, deployable flap; and,
(b) said docking bay contacts each have an exposed, substantially flat, contact surface substantially coplanar with the other docking bay contact surface, each said surface facing obliquely upward to make electrical contact with said vehicle contacts when said flap is deployed and said vehicle is driven into said docking bay.

* * * * *